(12) United States Patent
Ikoma

(10) Patent No.: US 11,561,190 B2
(45) Date of Patent: Jan. 24, 2023

(54) LIQUID DETECTION SENSOR AND LIQUID DETECTOR

(71) Applicant: TATSUTA ELECTRIC WIRE & CABLE CO., LTD., Higashiosaka (JP)

(72) Inventor: Koujirou Ikoma, Higashiosaka (JP)

(73) Assignee: TATSUTA ELECTRIC WIRE & CABLE CO., LTD., Osaka (JP)

( * ) Notice: Subject to any disclaimer, the term of this patent is extended or adjusted under 35 U.S.C. 154(b) by 69 days.

(21) Appl. No.: 16/954,951

(22) PCT Filed: Sep. 25, 2018

(86) PCT No.: PCT/JP2018/035421
§ 371 (c)(1),
(2) Date: Jun. 17, 2020

(87) PCT Pub. No.: WO2019/123750
PCT Pub. Date: Jun. 27, 2019

(65) Prior Publication Data
US 2020/0333276 A1    Oct. 22, 2020

(30) Foreign Application Priority Data
Dec. 18, 2017 (JP) .............................. JP2017-241553

(51) Int. Cl.
*G01N 27/12* (2006.01)
*G01M 3/18* (2006.01)

(52) U.S. Cl.
CPC .............. *G01N 27/12* (2013.01); *G01M 3/18* (2013.01)

(58) Field of Classification Search
CPC .......... G01N 27/12; G01M 3/18; G01M 3/16
See application file for complete search history.

(56) References Cited

U.S. PATENT DOCUMENTS

| 6,679,101 B1 | 1/2004 | Roehner |
| 7,712,363 B2 | 5/2010 | Takeo et al. |
| 2003/0094033 A1 | 5/2003 | Gibbs |

(Continued)

FOREIGN PATENT DOCUMENTS

| CN | 101576607 A | 11/2009 |
| CN | 103612722 A | 3/2014 |

(Continued)

OTHER PUBLICATIONS

European Search Report corresponding to European Application No. EP 18 89 1872, dated Aug. 3, 2021, 6 pages.

(Continued)

*Primary Examiner* — Alvaro E Fortich
*Assistant Examiner* — Zannatul Ferdous
(74) *Attorney, Agent, or Firm* — Reising Ethington P.C.

(57) ABSTRACT

A liquid detection sensor includes a first electrode, an insulating layer and a second electrode. The insulating layer is located on the first electrode. The second electrode is located on the insulating layer. A surface of the second electrode is provided with a first hole passing through each of the second electrode and the insulating layer. The first electrode and the second electrode are configured to be rendered conductive through liquid collected in the first hole. Accordingly, the liquid detection sensor and a liquid detector are provided that can reduce malfunctions.

13 Claims, 8 Drawing Sheets

(56) References Cited

U.S. PATENT DOCUMENTS

| | | | | |
|---|---|---|---|---|
| 2012/0156588 A1* | 6/2012 | Gronwald | ........... | H01M 8/1067 |
| | | | | 429/482 |
| 2013/0266644 A1* | 10/2013 | Fromm | .................... | C12Q 1/04 |
| | | | | 424/451 |
| 2015/0084614 A1 | 3/2015 | Alatainio | | |
| 2015/0362397 A1 | 12/2015 | Yu | | |
| 2015/0362447 A1* | 12/2015 | Johnson | ............... | G01N 27/025 |
| | | | | 324/656 |
| 2016/0156996 A1* | 6/2016 | Balatchev | ................. | F17D 5/06 |
| | | | | 340/10.4 |
| 2017/0356868 A1 | 12/2017 | Asmus et al. | | |
| 2018/0024023 A1* | 1/2018 | Yoshitomi | .............. | G01N 27/06 |
| | | | | 73/40.5 R |
| 2019/0178839 A1* | 6/2019 | Lyford | ................... | G01N 27/06 |

FOREIGN PATENT DOCUMENTS

| | | |
|---|---|---|
| CN | 203615082 U | 5/2014 |
| CN | 104272076 A | 1/2015 |
| CN | 106225999 A | 12/2016 |
| CN | 106838630 A | 6/2017 |
| JP | S50139785 A | 11/1975 |
| JP | S5180280 A | 7/1976 |
| JP | S53083173 U | 7/1978 |
| JP | S61158847 U | 10/1986 |
| JP | 2003507730 A | 2/2003 |
| JP | 2003185524 A | 7/2003 |
| JP | 2007143895 A | 6/2007 |
| JP | 2015517650 A | 6/2015 |
| JP | 2016509221 A | 3/2016 |
| KR | 101763065 B1 | 8/2017 |
| WO | WO2013164517 A1 | 11/2013 |
| WO | 2016121952 A1 | 8/2016 |
| WO | WO2016121952 A1 | 10/2017 |
| WO | WO2019123750 A1 | 6/2019 |
| WO | WO-2019123750 A1 * | 6/2019 ............. G01M 3/16 |

OTHER PUBLICATIONS

International Search Report with English translation corresponding to International Application No. PCT/JP2018/035421, dated Dec. 18, 2018, 5 pages.

Written Opinion corresponding to International Application No. PCT/JP2018/035421, dated Dec. 18, 2018, 3 pages.

Indian Office Action corresponding to Indian Application 202017029234; dated Mar. 4, 2022; 6 pages.

Chinese Office Action corresponding to Chinese Application 201880081637.4; dated Nov. 16, 2022; 26 pages.

* cited by examiner

LIQUID DETECTION SENSOR AND LIQUID DETECTOR

TECHNICAL FIELD

The present invention relates to a liquid detection sensor and a liquid detector.

BACKGROUND ART

Japanese Patent Laying-Open No. 2007-143895 (PTL 1) discloses a water detection sheet including a porous metallic sheet, a nonporous metallic sheet, and a permeable fabric sheet sandwiched between the porous metallic sheet and the nonporous metallic sheet. The water detection sheet is designed such that liquid flows through holes of the porous metallic sheet and diffuses in the permeable fabric sheet to render the porous metallic sheet and the nonporous metallic sheet conductive.

Japanese Utility Model Laying-Open No. 61-158847 (PTL 2) discloses a water leakage detection structure including a water-absorbing tape, two parallel conductors provided on one surface of the water-absorbing tape, and an insulating layer provided on the parallel conductors. The water leakage detection structure is designed such that the two parallel conductors are rendered conductive as water diffuses in the water-absorbing tape.

CITATION LIST

Patent Literature

PTL 1: Japanese Patent Laying-Open No. 2007-143895
PTL 2: Japanese Utility Model Laying-Open No. 61-158847

SUMMARY OF INVENTION

Technical Problem

In the water detection sheet disclosed in PTL 1, the permeable fabric sheet having high hygroscopic properties is used. Also, in the water leakage detection structure disclosed in PTL 2, the water-absorbing tape is used. Thus, as the permeable fabric sheet of PTL 1 and the water-absorbing tape of PTL 2 absorb water in the air, the insulation properties between two electrodes may become worse. As a result, a gradual decrease in the insulation resistance between the two electrodes may cause a malfunction of the liquid detection sensor.

One embodiment of the present invention has been made to solve the above problem, and an object thereof is to provide a liquid detection sensor and a liquid detector capable of reducing malfunctions.

Solution to Problem

A liquid detection sensor according to one embodiment of the present invention includes a first electrode, an insulating layer, and a second electrode. The insulating layer is located on the first electrode. The second electrode is located on the insulating layer. A surface of the second electrode is provided with a first hole passing through each of the second electrode and the insulating layer. The first electrode and the second electrode are configured to be rendered conductive by liquid collected in the first hole.

Advantageous Effects of Invention

One embodiment of the present invention can provide a liquid detection sensor and a liquid detector capable of reducing malfunctions.

DESCRIPTION OF EMBODIMENTS

Figure 1:
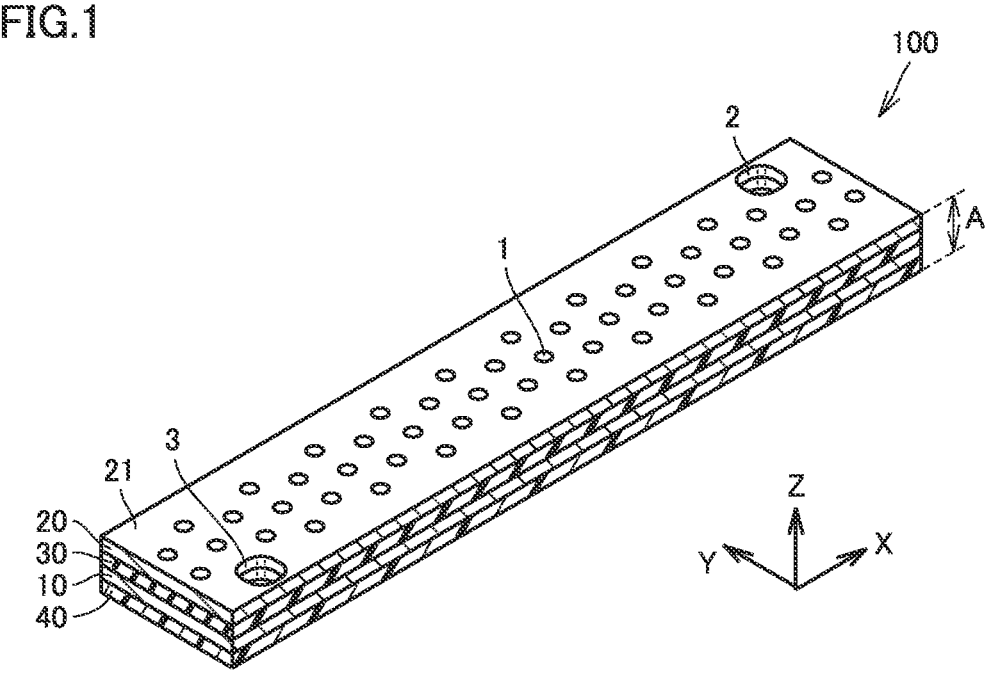
FIG. 1 is a schematic perspective view showing a configuration of a liquid detection sensor according to Embodiment 1.

Embodiments of the present invention will now be described with reference to the drawings, in which the same or corresponding parts are designated by the same reference numerals, and description thereof will not be repeated.

Embodiment 1

First, a configuration of a liquid detection sensor according to Embodiment 1 of the present invention will be described.

Figure 2:
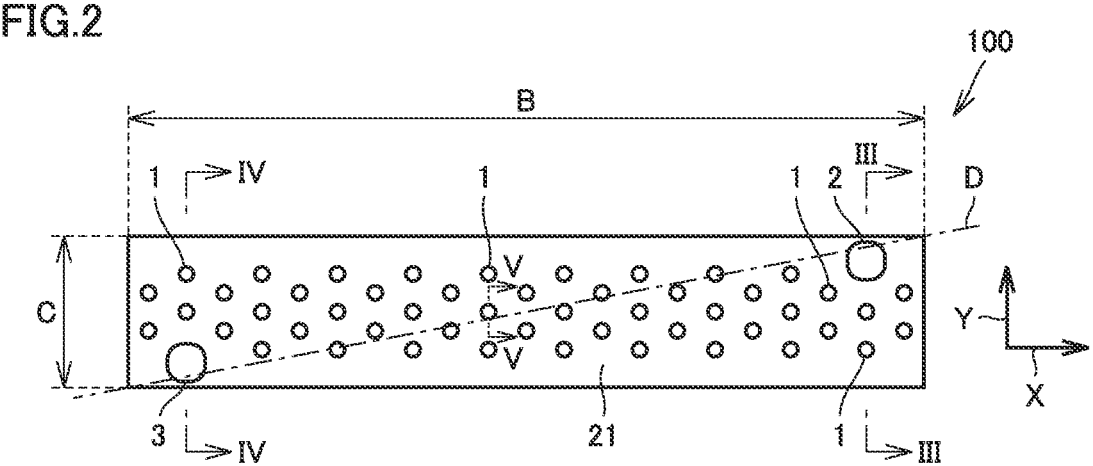
FIG. 2 is a schematic plan view showing a configuration of the liquid detection sensor according to Embodiment 1.

As shown in FIGS. 1 and 2, a liquid detection sensor 100 according to Embodiment 1 mainly includes a first electrode 10, an insulating layer 30, a second electrode 20, and an adhesive layer 40. First electrode 10 is located on adhesive layer 40. Insulating layer 30 is located on first electrode 10. Second electrode 20 is located on insulating layer 30. Each of first electrode 10 and second electrode 20 is an electrical conductor. Each of first electrode 10 and second electrode 20 is formed, for example, through adhesion of a metal, such as copper or nickel, and carbon to a fiber, such as cloth. Alternatively, each of first electrode 10 and second electrode 20 may be a metallic foil, such as copper foil or aluminum foil. Each of first electrode 10 and second electrode 20 has a thickness of, for example, 90 µm. Insulating layer 30 is made of acrylic resin, for example. Insulating layer 30 has a thickness of, for example, 240 µm.

Each of first electrode 10, insulating layer 30, second electrode 20, and adhesive layer 40 is in the form of a tape, for example. Specifically, as shown in FIG. 2, first electrode 10 extends in each of a longitudinal direction X and a transverse direction Y perpendicular to longitudinal direction X, as viewed from the direction perpendicular to a surface 21 of second electrode 20. The length of first electrode 10 in longitudinal direction X is larger than the length of first electrode 10 in transverse direction Y. The length of first electrode 10 in a thickness direction Z is smaller than the length of first electrode 10 in transverse direction Y. The outer shapes of second electrode 20, adhesive layer 40, and insulating layer 30 are nearly identical to that of first electrode 10. Transverse direction Y is perpendicular to longitudinal direction X. Thickness direction Z is perpendicular to each of longitudinal direction X and transverse direction Y. A length A of liquid detection sensor 100 in thickness direction Z is, for example, 0.05 mm or more and 5 mm or less. A length B of liquid detection sensor 100 in longitudinal direction X is, for example, 10 mm or more and 10000 mm or less. A length C of liquid detection sensor 100 in transverse direction Y is, for example, 5 mm or more and 1000 mm or less.

Surface 21 of second electrode 20 is provided with first holes 1. Liquid 4 (see FIG. 5) to be detected can be collected in first hole 1. Although it suffices that one first hole 1 is provided, a plurality of (two or more) first holes 1 may be provided. As shown in FIG. 2, first holes 1 are spaced from each other in each of longitudinal direction X and transverse direction Y. The interval between adjacent two first holes 1 may be greater than the diameter of first hole 1. It suffices that the diameter of first hole 1 is larger than or equal to such a size that allows liquid 4 enters first hole 1. The diameter of first hole 1 is, for example, 2 mm.

Surface 21 of second electrode 20 may be provided with a second hole 2. Second hole 2 is configured to allow a terminal of a detection portion 55, which will be described below, to be disposed therein. Although one second hole 2 is provided, for example, two or more second holes 2 may be provided. As shown in FIG. 2, second hole 2 is provided near a corner of surface 21 of second electrode 20. Second hole 2 is apart from first holes 1. As shown in FIG. 2, the shape of second hole 2 may be different from or identical to the shape of first hole 1, as viewed from the direction perpendicular to surface 21 of second electrode 20. The opening of second hole 2 may have an area larger than the area of the opening of first hole 1.

Surface 21 of second electrode 20 may be provided with a third hole 3. Third hole 3 is configured to allow a terminal of a termination resistor unit 65, which will be described below, to be disposed therein. Although one third hole 3 is provided, for example, two or more third holes 3 may be provided. As shown in FIG. 2, third hole 3 is provided near a corner of surface 21 of second electrode 20. Third hole 3 is apart from each of first holes 1 and second hole 2. As shown in FIG. 2, the shape of third hole 3 may be different from or identical to the shape of first hole 1, as viewed from the direction perpendicular to surface 21 of second electrode 20. The opening of third hole 3 may have an area larger than the area of the opening of first hole 1. First electrode 10 has a substantially rectangular shape as viewed from the direction perpendicular to surface 21 of second electrode 20. Second hole 2 and third hole 3 may be disposed in a diagonal line D of first electrode 10 as viewed from the direction perpendicular to surface 21 of second electrode 20. Diagonal line D is inclined to each of longitudinal direction X and transverse direction Y as viewed from the direction perpendicular to surface 21 of second electrode 20.

Figure 3:
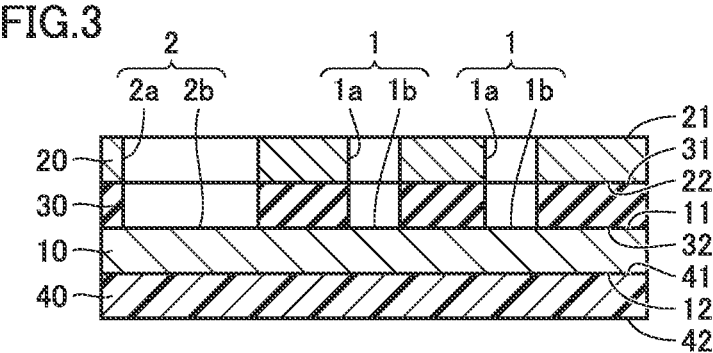
FIG. 3 is a schematic sectional view taken along line of FIG. 2.

FIG. 3 is a schematic sectional view taken along line of FIG. 2. As shown in FIG. 3, first hole 1 passes through each of second electrode 20 and insulating layer 30. First hole 1 reaches first electrode 10. First hole 1 is defined by a first lateral surface 1a and a first bottom surface 1b continuous with first lateral surface 1a. Each of second electrode 20 and insulating layer 30 is exposed to first lateral surface 1a. From another point of view, first lateral surface 1a is formed by second electrode 20 and insulating layer 30. First electrode 10 is exposed to first bottom surface 1b. From another point of view, first bottom surface 1b is formed by first electrode 10.

First electrode 10 has a first main surface 11 and a second main surface 12 opposite to first main surface 11. Similarly, second electrode 20 has a third main surface 21 and a fourth main surface 22 opposite to third main surface 21. Insulating layer 30 has a fifth main surface 31 and a sixth main surface 32 opposite to fifth main surface 31. Adhesive layer 40 has a seventh main surface 41 and an eighth main surface 42 opposite to seventh main surface 41. First main surface 11 is mostly in contact with sixth main surface 32. Part of first main surface 11 is not in contact with sixth main surface 32 and is exposed. From another point of view, part of first main surface 11 forms first bottom surface 1b of first hole 1. Second main surface 12 is in contact with seventh main surface 41. Third main surface 21 is surface 21 of second electrode 20. Eighth main surface 42 is a rear surface of adhesive layer 40. Fifth main surface 31 is in contact with fourth main surface 22.

First hole 1 can collect liquid 4 therein. It suffices that liquid 4 is fluid in the environment in which liquid detection sensor 100 is used. Liquid 4 is a conductive liquid 4 capable of rendering first electrode 10 and second electrode 20 conductive. Although liquid 4 is water, for example, it is not limited to water. Liquid 4 may be an acid, an alkali, or a chemical liquid. In order to efficiently collect liquid 4 in first hole 1, it is preferable that liquid 4 be not absorbed by a material for first lateral surface 1a of first hole 1. When liquid 4 is water, the material for insulating layer 30 of first lateral surface 1a is preferably hydrophobic or water-repellent. Insulating layer 30 is, for example, a polystyrene, vinyl acetate, polyester, polyethylene, polypropylene, polyamide, rubber, or acrylic thermoplastic resin. Insulating layer 30 may be, for example, a phenolic, epoxy, urethane, melamine, or alkyd thermosetting resin.

Second hole 2 passes through each of second electrode 20 and insulating layer 30 to first electrode 10. Second hole 2 is defined by a second lateral surface 2a and a second bottom surface 2b continuous with second lateral surface 2a. Each of second electrode 20 and insulating layer 30 is exposed to second lateral surface 2a. From another point of view, second lateral surface 2a is formed by second electrode 20 and insulating layer 30. First electrode 10 is exposed to second bottom surface 2b. From another point of view, second bottom surface 2b is formed by first electrode 10. Part of first main surface 11 forms second bottom surface 2b of second hole 2.

Figure 4:
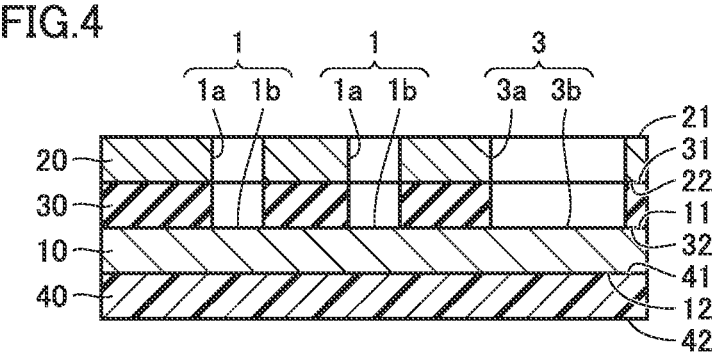
FIG. 4 is a schematic sectional view taken along line IV-IV of FIG. 2.

FIG. 4 is a schematic sectional view taken along line IV-IV of FIG. 2. As shown in FIG. 4, third hole 3 passes through each of second electrode 20 and insulating layer 30 to first electrode 10. Third hole 3 is defined by a third lateral surface 3a and a third bottom surface 3b continuous with third lateral surface 3a. Each of second electrode 20 and insulating layer 30 is exposed to third lateral surface 3a. From another point of view, third lateral surface 3a is formed by second electrode 20 and insulating layer 30. First electrode 10 is exposed to third bottom surface 3b. From another point of view, third bottom surface 3b is formed by first electrode 10. Part of first main surface 11 forms third bottom surface 3b of third hole 3.

Next, an operation of liquid detection sensor 100 according to Embodiment 1 will be described.

Figure 5:
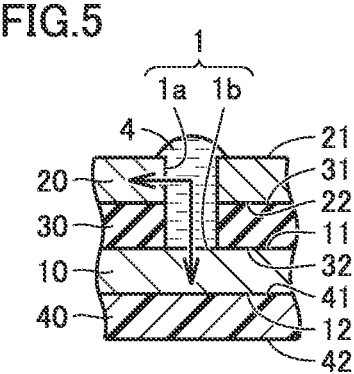
FIG. 5 is a schematic sectional view taken along line V-V of FIG. 2 with liquid collected in a first hole.

Liquid detection sensor 100 can be used as, for example, a water detection sensor and can detect, for example, a leakage of cooling water of a battery of an electric vehicle. Liquid detection sensor 100 is, for example, disposed outside of a pipe for flowing cooling water. The cooling water (liquid 4) leaking from the pipe enters first hole 1 of liquid detection sensor 100. As shown in FIG. 5, when liquid 4 is collected in first hole 1 and contacts second electrode 20, first electrode 10 and second electrode 20 are rendered conductive through liquid 4. From another point of view, liquid detection sensor 100 is configured to render first electrode 10 and second electrode 20 conductive through liquid 4 collected in first hole 1. As first electrode 10 and second electrode 20 are rendered conductive, an electrical resistance between first electrode 10 and second electrode 20 changes. A leakage of liquid 4 can be detected by detecting a change in electrical resistance.

Next, an example method of manufacturing liquid detection sensor 100 according to Embodiment 1 will be described.

First, a first member including a lamination of insulating layer 30 and second electrode 20 is prepared. The first member is punched with a puncher, so that first holes 1 passing through each of insulating layer 30 and second electrode 20 are formed. Similarly, second hole 2 and third hole 3 passing through each of insulating layer 30 and second electrode 20 are formed at positions different from those of first holes 1. Subsequently, a second member including a lamination of first electrode 10 and adhesive layer 40 is prepared. The punched first member is attached to the second member. Thus, liquid detection sensor 100 according to Embodiment 1 is manufactured.

Next, a configuration of a first modification of liquid detection sensor 100 according to Embodiment 1 will be described.

Figure 6:
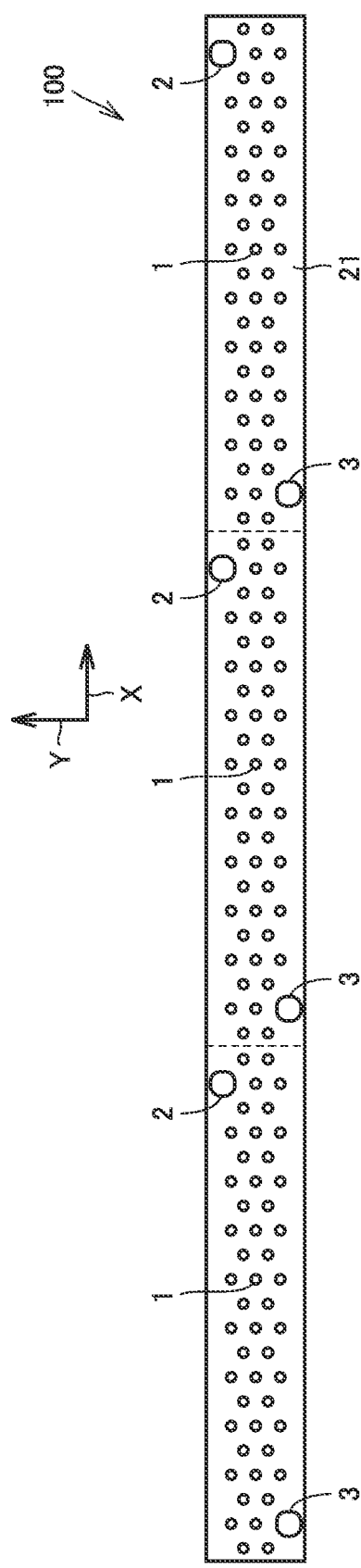
FIG. 6 is a schematic plan view showing a configuration of a first modification of the liquid detection sensor according to Embodiment 1.

As shown in FIG. 6, first holes 1 may form a specific pattern as viewed from the direction perpendicular to surface 21 of second electrode 20. The specific pattern is, for example, a zigzag arrangement. Specifically, two or three first holes 1 are disposed in transverse direction Y. Two first holes 1 and three first holes 1 are disposed alternately in longitudinal direction X. In transverse direction Y, each of the two first holes 1 is disposed between two adjacent first holes 1 among the three first holes 1. As shown in FIG. 6, the specific pattern may be repeated in longitudinal direction X. The number of repeated patterns is not particularly limited. The number of repeated patterns is, for example, three or more.

Next, a configuration of a second modification of liquid detection sensor 100 according to Embodiment 1 of the present invention will be described.

Figure 7:
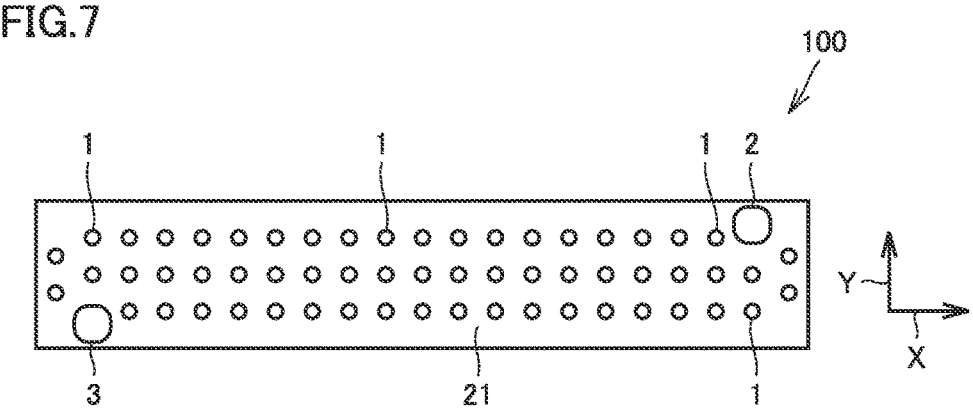
FIG. 7 is a schematic plan view showing a configuration of a second modification of the liquid detection sensor according to Embodiment 1.

As shown in FIG. 7, first holes 1 may be disposed in a lattice pattern as viewed from the direction perpendicular to surface 21 of second electrode 20. Specifically, first holes 1 may be disposed at regular intervals in longitudinal direction X. Similarly, first holes 1 may be disposed at regular intervals in transverse direction Y. The interval between two adjacent first holes 1 in longitudinal direction X may be identical to or different from the interval between two adjacent first holes 1 in transverse direction Y.

Next, the functions and effects of liquid detection sensor 100 according to Embodiment 1 will be described.

Liquid detection sensor 100 according to Embodiment 1 includes first electrode 10, insulating layer 30, and second electrode 20. Insulating layer 30 is located on first electrode 10. Second electrode 20 is located on insulating layer 30. Surface 21 of second electrode 20 is provided with first hole 1 passing through each of second electrode 20 and insulating layer 30. First electrode 10 and second electrode 20 are configured to be rendered conductive through liquid 4 collected in first hole 1. Liquid detection sensor 100 according to Embodiment 1 can restrain absorption of liquid 4 by insulating layer 30. Thus, malfunctions of liquid detection sensor 100 can be reduced more than those of liquid detection sensor 100 in which first electrode 10 and second electrode 20 are rendered conductive through the absorption of liquid 4 by insulating layer 30.

In liquid detection sensor 100 according to Embodiment 1, surface 21 is provided with second hole 2 apart from first holes 1. Second hole 2 has a shape different from the shape of first hole 1 as viewed from the direction perpendicular to surface 21. Second hole 2 passes through each of second electrode 20 and insulating layer 30 to first electrode 10. Thus, detection unit 55 can be attached more easily to liquid detection sensor 100 than when first electrode 10 and second electrode 20 are not exposed.

In liquid detection sensor 100 according to Embodiment 1, further, surface 21 is provided with third hole 3 apart from each of first holes 1 and second hole 2. Third hole 3 has a shape different from the shape of first hole 1 as viewed from the direction perpendicular to surface 21. Third hole 3 passes through each of second electrode 20 and insulating layer 30 to first electrode 10. Thus, termination resistor unit 65 can be more easily attached to liquid detection sensor 100 than when first electrode 10 and second electrode 20 are not exposed.

In liquid detection sensor 100 according to Embodiment 1, further, second hole 2 and third hole 3 are disposed in a diagonal line of first electrode 10, as viewed from the direction perpendicular to surface 21. In this case, when liquid detection sensor 100 is rotated by 180°, third hole 3 overlaps the former position of second hole 2. Detection unit 55 can thus be attached to any of second hole 2 and third hole 3. This leads to improved efficiency of attaching detection unit 55.

In liquid detection sensor 100 according to Embodiment 1, further, first electrode 10 extends in each of longitudinal direction X and transverse direction Y perpendicular to longitudinal direction X, as viewed from the direction perpendicular to surface 21. This allows detection of a leakage of liquid 4 in a large region.

In liquid detection sensor 100 according to Embodiment 1, further, first hole 1 includes a plurality of first holes 1. First holes 1 form a specific pattern as viewed from the direction perpendicular to surface 21. The specific pattern is repeated in longitudinal direction X. This allows detection of a leakage of liquid 4 and adjustment of the length of liquid detection sensor 100 in accordance with the length of a detection target.

Embodiment 2

Next, a configuration of a liquid detector 200 according to Embodiment 2 of the present invention will be described.

Figure 8:
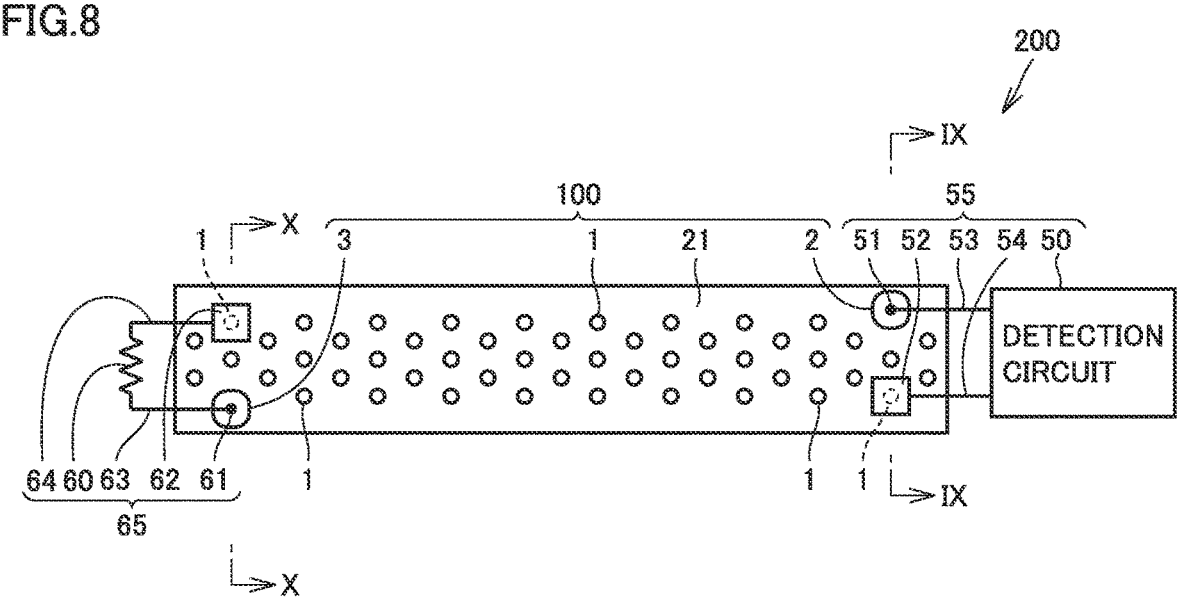
FIG. 8 is a schematic plan view showing a configuration of a liquid detector according to Embodiment 2.

As shown in FIG. 8, liquid detector 200 according to Embodiment 2 mainly includes liquid detection sensor 100, detection unit 55, and termination resistor unit 65. Each of detection unit 55 and termination resistor unit 65 is attached to liquid detection sensor 100. Specifically, detection unit 55 is attached to one end side of liquid detection sensor 100 in longitudinal direction X. Termination resistor unit 65 is attached to the other end side of liquid detection sensor 100 in longitudinal direction X. Liquid detection sensor 100 is, for example, disposed between detection unit 55 and termination resistor unit 65.

Figure 9:
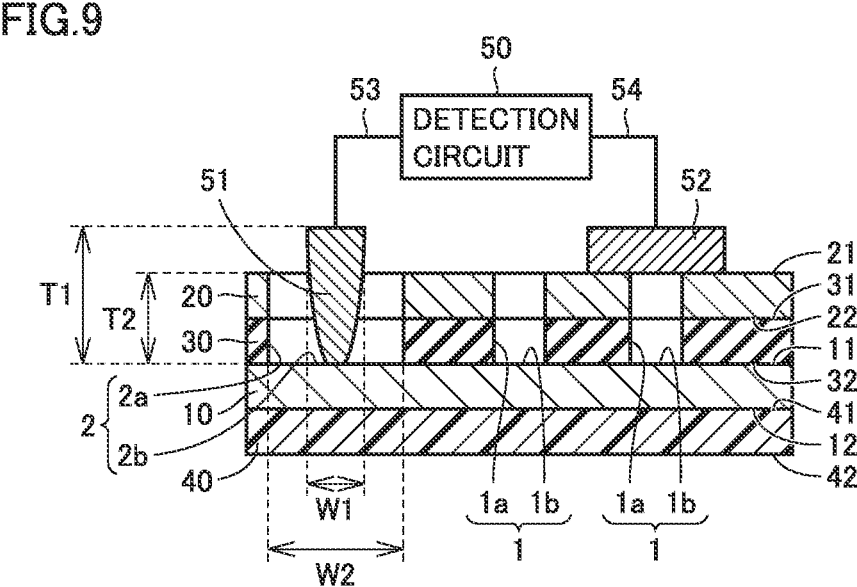
FIG. 9 is a schematic sectional view taken along line IX-IX of FIG. 8.

As shown in FIGS. 8 and 9, detection unit 55 includes a detection circuit 50, a first terminal 51, a second terminal 52, a first wire 53, and a second wire 54. First wire 53 connects first terminal 51 and detection circuit 50 to each other. Second wire 54 connects second terminal 52 and detection circuit 50 to each other. Detection circuit 50 is configured to measure, for example, a voltage (resistance) between first terminal 51 and second terminal 52. First terminal 51 is connectable with first electrode 10 through second hole 2. Second terminal 52 is connectable with second electrode 20.

As shown in FIG. 9, a maximum width W1 of first terminal 51 may be smaller than a diameter W2 of second hole 2. When second hole 2 has a shape other than a circle as viewed from the direction perpendicular to surface 21 of second electrode 20, diameter W2 of second hole 2 is, for example, the diameter of the inscribed circle of second hole 2. A height T1 of first terminal 51 may be larger than a total height T2 of insulating layer 30 and second electrode 20.

As shown in FIG. 8, second terminal 52 has an area larger than the area of first hole 1 as viewed from the direction perpendicular to surface 21 of second electrode 20. Second terminal 52 has, for example, a quadrangular shape. The outer shape of second terminal 52 may surround first hole 1. Second terminal 52 is disposed to be in contact with second electrode 20. Second terminal 52 may be disposed to face first bottom surface 1b of first hole 1. Second terminal 52 may be disposed to close first hole 1.

Figure 10:
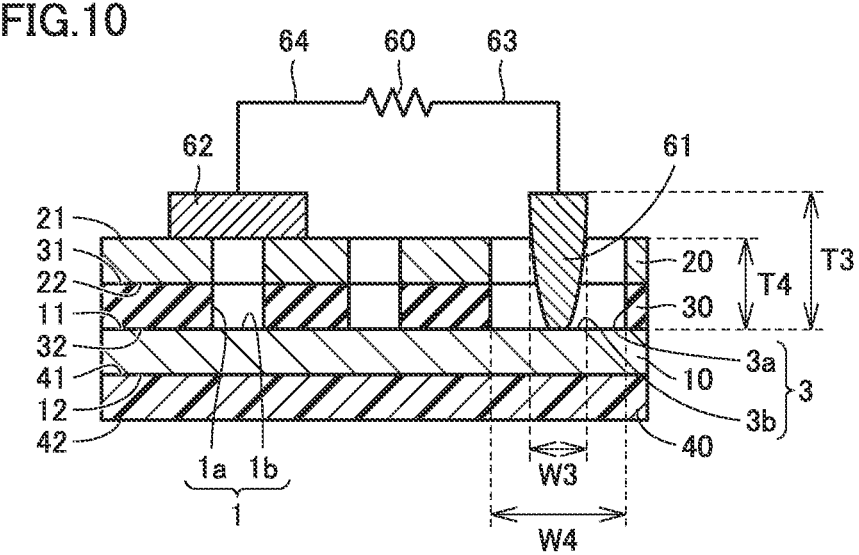
FIG. 10 is a schematic sectional view taken along line X-X of FIG. 8.

As shown in FIGS. 8 and 10, termination resistor unit 65 includes a resistive element 60, a third terminal 61, a fourth terminal 62, a third wire 63, and a fourth wire 64. Third wire 63 connects third terminal 61 and resistive element 60 to each other. Fourth wire 64 connects fourth terminal 62 and resistive element 60 to each other. One end of resistive element 60 is connected to third wire 63. The other end of resistive element 60 is connected to fourth wire 64. Third terminal 61 is connectable with first electrode 10 through third hole 3. Fourth terminal 62 is connectable with second electrode 20. The electrical resistance of resistive element 60 is, for example, 100 kΩ.

As shown in FIG. 10, a maximum width W3 of third terminal 61 may be smaller than a diameter W4 of third hole 3. When third hole 3 has a shape other than a circle as viewed from the direction perpendicular to surface 21 of second electrode 20, diameter W4 of third hole 3 is, for example, the diameter of the inscribed circle of third hole 3. A height T3 of third terminal 61 may be larger than a total height T4 of insulating layer 30 and second electrode 20.

As shown in FIG. 8, fourth terminal 62 has an area larger than the area of first hole 1 as viewed from the direction perpendicular to surface 21 of second electrode 20. Fourth terminal 62 has, for example, a quadrangular shape. The outer shape of fourth terminal 62 may surround first hole 1. Fourth terminal 62 is disposed to be in contact with second electrode 20. Fourth terminal 62 may be disposed to face first bottom surface 1b of first hole 1. Fourth terminal 62 may be disposed to close first hole 1.

Although the above has described the case in which liquid detection sensor 100 according to Embodiment 1 is used as liquid detection sensor 100 of liquid detector 200 according to Embodiment 2, liquid detection sensor 100 of liquid detector 200 according to Embodiment 2 is not limited to liquid detection sensor 100 according to Embodiment 1. A liquid detection sensor 100 according to Embodiment 3 or any other liquid detection sensor 100 may be used as liquid detection sensor 100 of liquid detector 200 according to Embodiment 2.

Next, the functions and effects of liquid detector 200 according to Embodiment 2 will be described.

Liquid detector 200 according to Embodiment 2 includes liquid detection sensor 100 and detection unit 55. Detection unit 55 is attached to liquid detection sensor 100. Detection unit 55 includes first terminal 51 and second terminal 52. First terminal 51 is connectable with first electrode 10 through second hole 2. Second terminal 52 is connectable with second electrode 20. Thus, detection unit 55 can be easily attached to liquid detection sensor 100.

In liquid detector 200 according to Embodiment 2, further, first terminal 51 has a maximum width smaller than the diameter of second hole 2 and has a height larger than the total height of insulating layer 30 and second electrode 20. This can restrain first terminal 51 from contacting second electrode 20.

In liquid detector 200 according to Embodiment 2, further, second terminal 52 has an area smaller than the area of first hole 1 as viewed from the direction perpendicular to surface 21. This can restrain second terminal 52 from contacting first electrode 10.

Liquid detector 200 according to Embodiment 2 may further include liquid detection sensor 100 and termination resistor unit 65. Termination resistor unit 65 is attached to liquid detection sensor 100. Termination resistor unit 65 includes third terminal 61 and fourth terminal 62. Third terminal 61 may be connectable with first electrode 10 through third hole 3. Fourth terminal 62 is connectable with second electrode 20. Thus, termination resistor unit 65 can be easily attached to liquid detection sensor 100. The attachment of termination resistor unit 65 to liquid detection sensor 100 can improve the accuracy of detecting liquid 4.

Embodiment 3

Next, a configuration of liquid detection sensor 100 according to Embodiment 3 of the present invention will be described. The configuration of liquid detection sensor 100 according to Embodiment 3 differs from the configuration of liquid detection sensor 100 according to Embodiment 1 mainly in that it includes a soluble insulating film 70 provided between first electrode 10 and insulating layer 30, and is similar to the configuration of liquid detection sensor 100 according to Embodiment 1 in other respects. The configuration different from that of liquid detection sensor 100 according to Embodiment 1 will be mainly described below.

Figure 11:
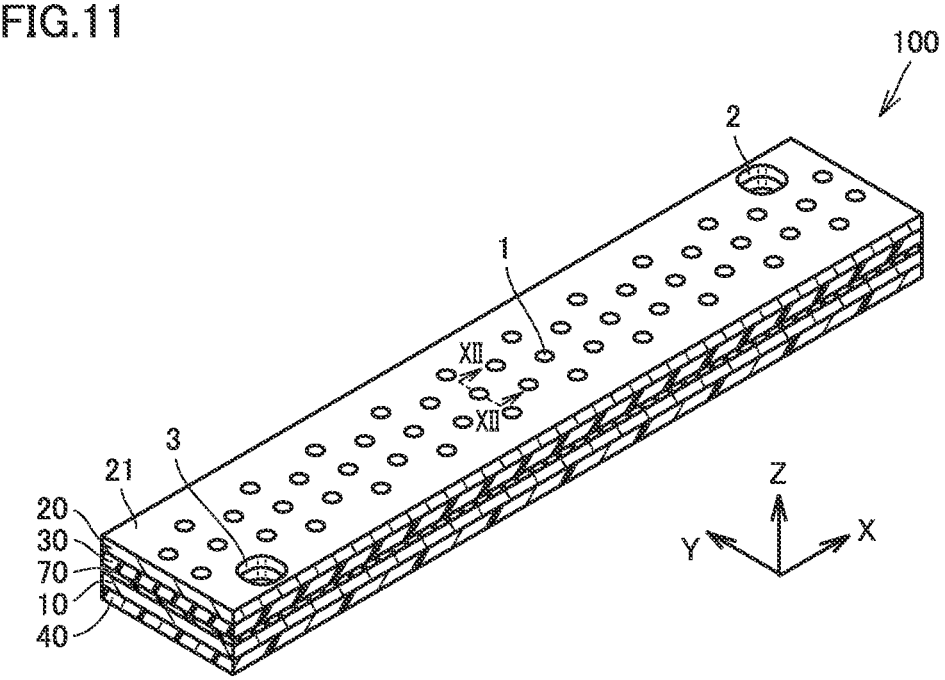
FIG. 11 is a schematic perspective view showing a configuration of a liquid detection sensor according to Embodiment 3.

As shown in FIG. 11, liquid detection sensor 100 according to Embodiment 3 mainly includes first electrode 10, insulating layer 30, second electrode 20, adhesive layer 40, and soluble insulating film 70. Soluble insulating film 70 is provided between first electrode 10 and insulating layer 30. Soluble insulating film 70 may extend in each of longitudinal direction X and transverse direction Y perpendicular to longitudinal direction X, as viewed from the direction perpendicular to surface 21 of second electrode 20. The length of soluble insulating film 70 in longitudinal direction X may be larger than the length of soluble insulating film 70 in transverse direction Y. The length of soluble insulating film 70 in the thickness direction may be smaller than the length of soluble insulating film 70 in transverse direction Y.

Figure 12:
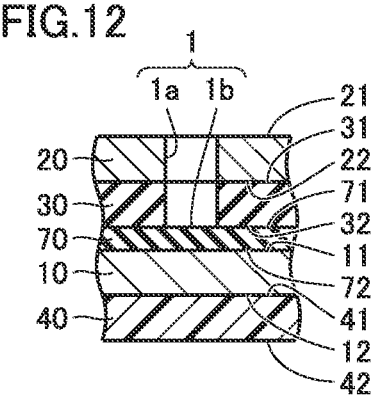
FIG. 12 is a schematic sectional view taken along line XII-XII of FIG. 11.

FIG. 12 is a schematic sectional view taken along line XII-XII of FIG. 11. As shown in FIG. 12, first hole 1 passes through each of second electrode 20 and insulating layer 30. First hole 1 reaches soluble insulating film 70. First hole 1 is defined by first lateral surface 1a and first bottom surface 1b continuous with first lateral surface 1a. Each of second electrode 20 and insulating layer 30 is exposed to first lateral surface 1a. From another point of view, first lateral surface 1a is formed by second electrode 20 and insulating layer 30. Soluble insulating film 70 is exposed to first bottom surface 1b. From another point of view, first bottom surface 1b is defined by soluble insulating film 70. In other words, soluble insulating film 70 forms part of first hole 1. It suffices that soluble insulating film 70 is disposed to form first bottom surface 1b of first hole 1 on first electrode 10, soluble insulating film 70 may not be disposed between first electrode 10 and insulating layer 30. Soluble insulating film 70 has a ninth main surface 71 and a tenth main surface 72 opposite to ninth main surface 71. Ninth main surface 71 is mostly in contact with sixth main surface 32. Part of ninth main surface 71 forms first bottom surface 1b of first hole 1. Tenth main surface 72 is in contact with first main surface 11.

Soluble insulating film 70 is soluble in a specific liquid 4. The specific liquid 4 is, for example, an acid, such as sulfuric acid, hydrochloric acid, or nitric acid.

Soluble insulating film 70 is soluble in, for example, acid. The material soluble in acid is, for example, polyester. In other words, polyester is a material having high reactivity to acid. Insulating layer 30 may be, for example, polyethylene. Polyethylene is insoluble in acid. In other words, polyethylene is a material having low reactivity to acid. Insulating layer 30 may be a material insoluble in acid. The specific liquid 4 may be, for example, alkali. Alkali may be, for example, a publicly known liquid 4, such as sodium hydroxide.

Next, an operation of liquid detection sensor 100 according to Embodiment 3 of the present invention will be described.

Figure 13:
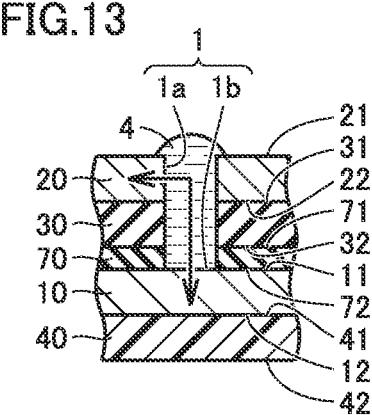
FIG. 13 is a schematic sectional view showing a state in which liquid is collected in a first hole.

Liquid detection sensor 100 can be used as, for example, an acid detection sensor. The acid detection sensor is, for example, disposed outside of a pipe for flowing acid. Acid (liquid 4) leaking from the pipe enters first hole 1 of liquid detection sensor 100. As shown in FIG. 13, soluble insulating film 70 is dissolved by acid which has entered first hole 1. This brings the acid into contact with second electrode 20. When the acid is collected in first hole 1, first electrode 10 and second electrode 20 are rendered conductive through the acid. The acid is conductive. The conduction between first electrode 10 and second electrode 20 changes the electrical resistance between first electrode 10 and second electrode 20. A leakage of acid can be detected through detection of a change in electrical resistance.

Liquid detection sensor 100 according to Embodiment 3 further includes soluble insulating film 70 provided on first electrode 10. Soluble insulating film 70 forms part of first hole 1 and is soluble in the specific liquid 4. This enables the detection of a leakage of the specific liquid 4.

Embodiment 4

Next, a configuration of a liquid detection sensor 100 according to Embodiment 4 of the present invention will be described. The configuration of liquid detection sensor 100 according to Embodiment 4 is different from the configuration of liquid detection sensor 100 according to Embodiment 1 mainly in that first electrical conductor 13 is connected to first electrode 10 and second electrode 20 is provided with second electrical conductor 14, and is identical to the configuration of liquid detection sensor 100 according to Embodiment 1 in other respects. The configuration different from that of liquid detection sensor 100 according to Embodiment 1 will be mainly described below.

Figure 14:
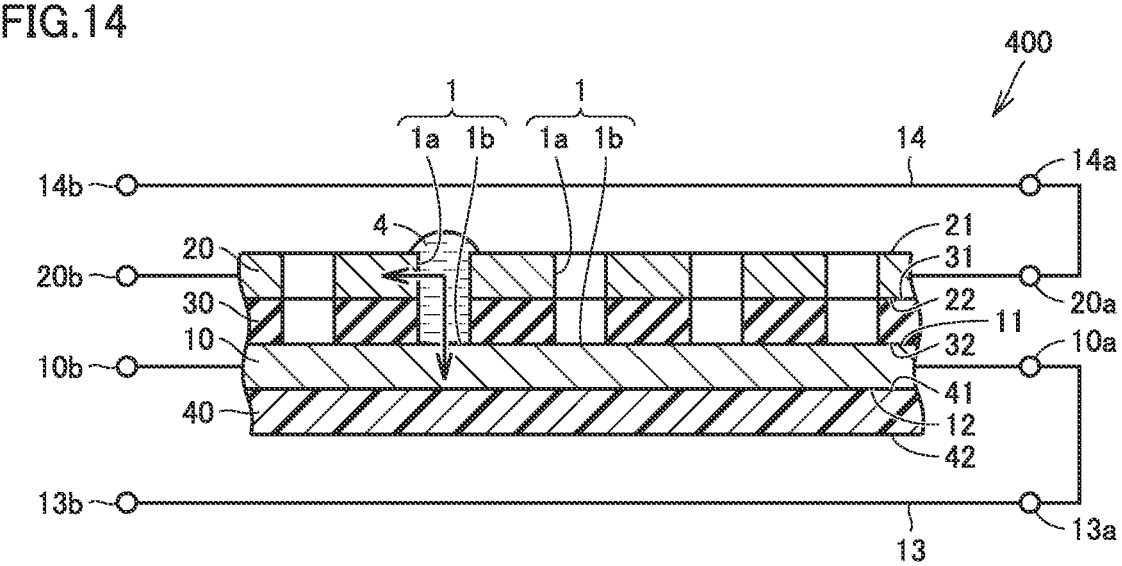
FIG. 14 is a schematic sectional view taken along line XIV-XIV of FIG. 15.

As shown in FIG. 14, liquid detection sensor 100 according to Embodiment 4 mainly includes first electrode 10, insulating layer 30, second electrode 20, adhesive layer 40, first electrical conductor 13, and second electrical conductor 14. Liquid detection sensor 100 according to Embodiment 4 can be used as a position detection system. Each of first electrical conductor 13 and second electrical conductor 14 is, for example, an insulation-coated conductive wire. First electrical conductor 13 has a third one end 13b and a third other end 13a. Similarly, second electrical conductor 14 has a fourth one end 14b and a fourth other end 14a.

Figure 15:
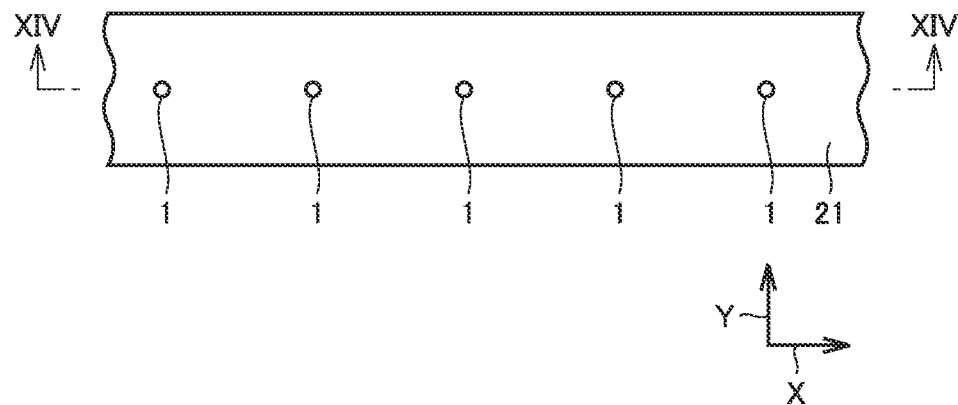
FIG. 15 is a schematic plan view showing a configuration of a liquid detection sensor according to Embodiment 4.

Third other end 13a of first electrical conductor 13 and first other terminal 10a of first electrode 10 are short-circuited. Similarly, fourth other end 14a of second electrical conductor 14 and second other end 20a of second electrode 20 are short-circuited. As shown in FIG. 15, first holes 1 are spaced from each other in longitudinal direction X. A pitch P between first holes 1 is larger than the diameter of first hole 1, as viewed from the direction perpendicular to surface 21 of second electrode 20. A resistance between first one terminal 10b of first electrode 10 and second one end 20b of second electrode 20 is measurable. A resistance between third one end 13b of first electrical conductor 13 and fourth one end 14b of second electrical conductor 14 is measurable.

Next, a method of detecting a position in longitudinal direction X by liquid detection sensor 100 according to Embodiment 4 will be described.

As shown in FIG. 14, liquid 4 is collected in one of first holes 1, thereby rendering first electrode 10 and second electrode 20 conductive. In this case, a position in longitudinal direction X at which liquid 4 has leaked can be specified by measuring a resistance ($R_x$) between first one end 10b of first electrode 10 and second one end 20b of second electrode 20 and a resistance ($R_y$) between third one end 13b of first electrical conductor 13 and fourth one end 14b of second electrical conductor 14.

Figure 16:
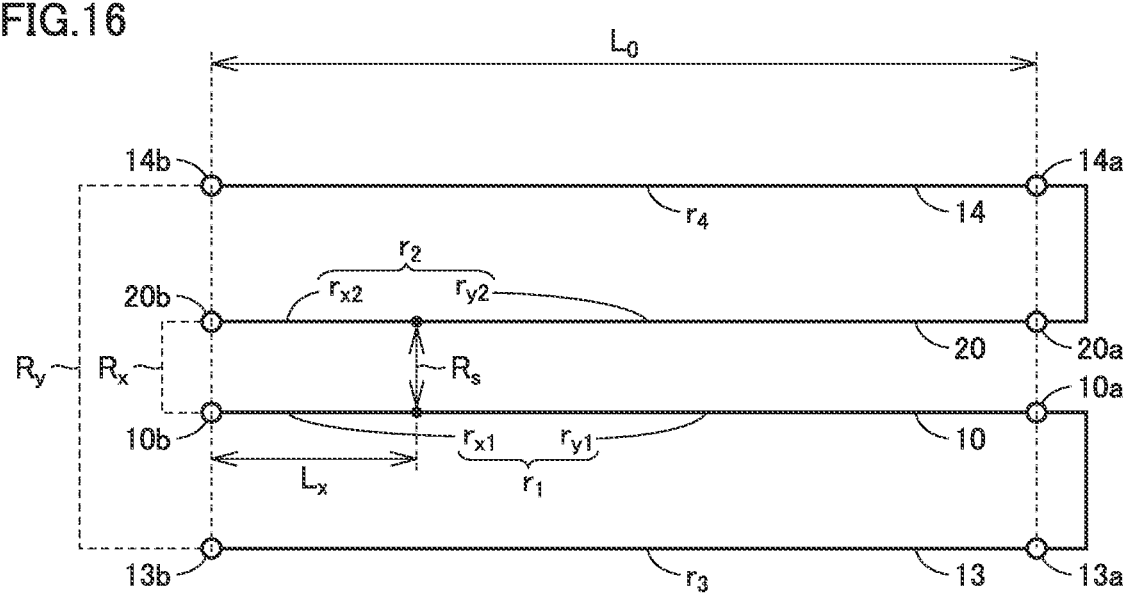
FIG. 16 is a schematic circuit diagram showing a configuration of the liquid detection sensor according to Embodiment 4.

As shown win FIG. 16, an electrical resistance over the entire length of first electrode 10 in longitudinal direction X and an electrical resistance over the entire length of second electrode 20 in longitudinal direction X are represented by $r_1$ and $r_2$, respectively. A distance over the entire length of first electrode 10 in longitudinal direction X and a distance over the entire length of second electrode 20 in longitudinal direction X are represented by $L_0$. A distance from each of first one terminal 10b and second one end 20b to first hole 1 with liquid 4 is represented by $L_x$. Electrical resistances between first one terminal 10b, second one end 20b and first hole 1 with liquid 4 are represented by $r_{x1}$ and $r_{x2}$, respectively. Electrical resistances between first other terminal 10a, second other end 20a and first hole 1 with liquid 4 are represented by $r_{y1}$ and $r_{y2}$, respectively. An electrical resistance of a conductive portion of liquid 4 that has entered first hole 1 is represented by $R_s$. An electrical resistance over the entire length of first electrical conductor 13 in longitudinal direction X and an electrical resistance over the entire length of second electrical conductor 14 in longitudinal direction X are represented by $r_3$ and $r_4$, respectively.

A resistance between first one terminal 10b of first electrode 10 and second one end 20b of second electrode 20 and a resistance between third one end 13b of first electrical conductor 13 and fourth one end 14b of second electrical conductor 14 are represented by $R_x$ and $R_y$, respectively. $R_x$ and $R_y$ are represented by equations below.

$$R_x = r_{x1} + R_s + r_{x2} \quad \text{(Equation 1)}$$

$$R_y = r_3 + r_{y1} + R_s + r_{y2} + r_4 \quad \text{(Equation 2)}$$

Equation 3 below is derived from Equation 1 and Equation 2.

$$R_x - R_y = r_{x1} + r_{x2} - r_3 - r_{y1} - r_{y2} - r_4 \quad \text{(Equation 3)}$$

Equation 4 below is derived by adding $r_{x1} + r_{x2}$ to both sides of Equation 3 and rearranging Equation 3.

$$r_{x1} + r_{x2} = \tfrac{1}{2} \times (R_x - R_y + r_{y1} + r_{y2} + r_{x1} + r_{x2} + r_3 + r_4) \quad \text{(Equation 4)}$$

Also, $r_1$ and $r_2$ are represented by equations below.

$$r_1 = r_{x1} + r_{y1} \quad \text{(Equation 5)}$$

$$r_2 = r_{x2} + r_{y2} \quad \text{(Equation 6)}$$

Further, $L_x$ is represented by an equation below.

$$L_x = L_0 \times (r_{x1} + r_{x2}) / (r_1 + r_2) \quad \text{(Equation 7)}$$

Equation 8 below is derived by introducing Equations 4 to 6 into Equation 7 above.

$$L_x = L_0 \times \tfrac{1}{2} \times (R_x - R_y + r_1 + r_2 + r_3 + r_4) / (r_1 + r_2) \quad \text{(Equation 8)}$$

In this equation, $r_1$, $r_2$, $r_3$, $r_4$, and $L_0$ are known values. Thus, $L_x$ can be derived with the use of Equation 8 by measuring $R_x$ and $R_y$. That is to say, the position of first hole 1 with liquid 4 in longitudinal direction X can be specified by using liquid detection sensor 100 according to Embodiment 4.

Liquid detection sensor 100 according to Embodiment 4 further includes first electrical conductor 13 connected to first electrode 10 and second electrical conductor 14 connected to second electrode 20. First hole 1 includes a plurality of first holes 1. First holes 1 are spaced from each other in longitudinal direction X. Thus, the position at which liquid 4 has leaked can be specified.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST 1 first hole, 1a first lateral surface, 1b first bottom surface, 2 second hole, 2a second lateral surface, 2b second bottom surface, 3 third hole, 3a third lateral surface, 3b third bottom surface, 4 liquid, 10 first electrode, 10a first other end, 10b first one end, 11 first main surface, 12 second main surface, 13 first electrical conductor, 13a third other end, 13b third one end, 14 second electrical conductor, 14a fourth other end, 14b fourth one end, 20 second electrode, 20a second other end, 20b second one end, 21 surface (third main surface), 22 fourth main surface, 30 insulating layer, 31 fifth main surface, 32 sixth main surface, 40 adhesive layer, 41 seventh main surface, 42 eighth main surface, 50 detection circuit, 51 first terminal, 52 second terminal, 53 first wire, 54 second wire, 55 detection unit, 60 resistive element, 61 third terminal, 62 fourth terminal, 63 third wire, 64 fourth wire, 65 termination resistor unit, 70 soluble insulating film, 71 ninth main surface, 72 tenth main surface, 100 liquid detection sensor, 200 liquid detector, X longitudinal direction, Y transverse direction, Z thickness direction.

The invention claimed is:

1. A liquid detection sensor comprising:
   a first electrode;
   an insulating layer located on the first electrode; and
   a second electrode located on the insulating layer,
   wherein a surface of the second electrode is provided with a first hole passing through each of the second electrode and the insulating layer but not through the first electrode, and
   the first electrode and the second electrode are configured to be rendered conductively connected through liquid collected in the first hole.

2. The liquid detection sensor according to claim 1, wherein
   the surface is provided with a second hole apart from the first hole,
   the second hole has a shape different from a shape of the first hole as viewed from a direction perpendicular to the surface, and
   the second hole passes through each of the second electrode and the insulating layer to the first electrode.

3. The liquid detection sensor according to claim 2, wherein
   the surface is provided with a third hole apart from each of the first hole and the second hole,
   the third hole has a shape different from the shape of the first hole as viewed from the direction perpendicular to the surface, and
   the third hole passes through each of the second electrode and the insulating layer to the first electrode.

4. The liquid detection sensor according to claim 3, wherein
   the second hole and the third hole are disposed in a diagonal line of the first electrode as viewed from the direction perpendicular to the surface.

5. The liquid detection sensor according to claim 1, wherein the first electrode extends in each of a longitudinal direction and a transverse direction perpendicular to the longitudinal direction as viewed from a direction perpendicular to the surface.

6. The liquid detection sensor according to claim 5, wherein
   the first hole is one of a plurality of first holes,
   the plurality of first holes form a specific pattern as viewed from the direction perpendicular to the surface, and
   the specific pattern is repeated in the longitudinal direction.

7. The liquid detection sensor according to claim 5, further comprising:
   a first electrical conductor connected to the first electrode; and
   a second electrical conductor connected to the second electrode,
   wherein the first hole is one of a plurality of first holes, and
   the plurality of first holes are spaced apart from each other in the longitudinal direction.

8. The liquid detection sensor according to claim 1, further comprising a soluble insulating film located on the first electrode, and
   the soluble insulating film forms part of the first hole and is soluble in a specific liquid.

9. A liquid detector comprising:
a liquid detection sensor according to claim 2; and
a detection unit attached to the liquid detection sensor, wherein
the detection unit includes a first terminal and a second terminal,
the first terminal is connectable with the first electrode through the second hole, and
the second terminal is connectable with the second electrode.

10. The liquid detector according to claim 9, wherein the first terminal has a maximum width smaller than a diameter of the second hole and has a height larger than a total height of the insulating layer and the second electrode.

11. The liquid detector according to claim 9, wherein the second terminal has an area larger than an area of the first hole as viewed from the direction perpendicular to the surface.

12. A liquid detector comprising:
a liquid detection sensor according to claim 3; and
a termination resistor unit attached to the liquid detection sensor, wherein
the termination resistor unit includes a third terminal and a fourth terminal,
the third terminal is connected with the first electrode through the third hole, and
the fourth terminal is connected with the second electrode.

13. The liquid detector according to claim 1, wherein the first hole passes through each of the second electrode and the insulating layer but not into the first electrode.

* * * * *